United States Patent
Zabkar et al.

(10) Patent No.: US 11,823,223 B2
(45) Date of Patent: *Nov. 21, 2023

(54) TRIGGERING AND THROTTLING ACCESS TO REWARD CARD SUPPLIER INTERFACES

(71) Applicant: Tango Card, Inc., Seattle, WA (US)

(72) Inventors: J J Zabkar, Edmonds, WA (US); Israel E. Evans, Seattle, WA (US); James A. Johnston, Edmonds, WA (US); Gregory S. Lee, Mercer Island, WA (US); Chek T. Lim, Bellevue, WA (US)

(73) Assignee: Tango Card, Inc., Seattle, WA (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/355,130

(22) Filed: Jun. 22, 2021

(65) Prior Publication Data

US 2021/0319469 A1 Oct. 14, 2021

Related U.S. Application Data

(63) Continuation of application No. 16/272,941, filed on Feb. 11, 2019, now Pat. No. 11,042,892, which is a continuation-in-part of application No. 15/480,296, filed on Apr. 5, 2017, now Pat. No. 11,182,818, which is a continuation of application No. 15/469,293, filed on Mar. 24, 2017, now abandoned.

(51) Int. Cl.
G06Q 30/00 (2023.01)
G06Q 30/0226 (2023.01)
G06Q 30/0601 (2023.01)

(52) U.S. Cl.
CPC ..... *G06Q 30/0233* (2013.01); *G06Q 30/0605* (2013.01); *G06Q 30/0613* (2013.01)

(58) Field of Classification Search
CPC ........... G06Q 30/0233; G06Q 30/0605; G06Q 30/0613
See application file for complete search history.

(56) References Cited

U.S. PATENT DOCUMENTS 10,565,642 B1 * 2/2020 Cieri ................ G06Q 10/06315
2002/0077973 A1 * 6/2002 Ronchi ................. G07F 7/1066
705/39

(Continued)

OTHER PUBLICATIONS

Hassan Masum; Mark Tovey; Craig Newmark, "Web Reputation Systems and the Real World," in The Reputation Society: How Online Opinions Are Reshaping the Offline World , MIT Press, 2011, pp. 13-24. (Year: 2011).*

(Continued)

*Primary Examiner* — Sun M Li
(74) *Attorney, Agent, or Firm* — Morgan, Lewis & Bockius LLP

(57) ABSTRACT

A reward card platform includes a database storing funding accounts, reward card purchase transactions, reward card brand options, and denomination options. The platform provides a user interface for purchasing reward cards from multiple third party suppliers. The user interface commits reward card purchase transactions using the funding accounts and specified reward card brand and denomination options. The platform obtains reward card items from supplier APIs corresponding to specified reward card brand and denomination options. The platform includes a buffer storing reward card inventory items. The platform also includes a provisioning module configured to: (i) select specified reward card inventory items to complete reward card purchase transactions when the specified reward card items are in the buffer; (ii) invoke a third party provider API to obtain reward card items when unavailable in the buffer; and (iii) replenish the buffer with the specified reward card items according to secondary supplier rate limits.

18 Claims, 8 Drawing Sheets

(56) References Cited

U.S. PATENT DOCUMENTS

| | | | |
|---|---|---|---|
| 2008/0275916 A1 | 11/2008 | Bohannon | |
| 2009/0244285 A1* | 10/2009 | Chathukutty | H04N 7/183 348/150 |
| 2010/0287099 A1 | 11/2010 | Liu et al. | |
| 2011/0054935 A1* | 3/2011 | Hardaway | G06Q 30/04 705/14.1 |
| 2015/0066738 A1 | 3/2015 | Tian et al. | |
| 2016/0012465 A1* | 1/2016 | Sharp | G06Q 20/321 705/14.17 |

OTHER PUBLICATIONS

Cryptography and Security (cs.CR); Operating Systems (cs.OS), ACM classes: D.4.6, Submitted on Feb. 1, 2010] Cite as: arXiv:1002. 0298 [cs.CR], (or arXiv:1002.0298v1 [cs.CR] for this version) https://doi.org/10.48550/arXiv.1002.0298 (Year: 2010).*

L. Shastri, S. Narasimhamurthy and D. P. Muni, "A novel rewards-based protocol and decision-making technique for transshipment in supply chains," 2010 IEEE International Conference on Industrial Engineering and Engineering Management, Macao, China, 2010, pp. 1133-1138, doi: 10.1109/IEEM.2010.5674322. (Year: 2010).*

Cyclic Consumption and Replenishment Decisions for Vendor-Managed Inventory of Multisourced Parts in Dell's Supply Chain Abhilasha Prakash Katariya, Sila Çetinkaya, Eylem Tekin Published Online:Jun. 4, 2014https://doi.org/10.1287/inte.2014.0745 (Year: 2014).*

J. Robert, S. Kubler and Y. Le Traon, "Micro-billing Framework for IoT: Research & Technological Foundations," 2016 IEEE 4th International Conference on Future Internet of Things and Cloud (FiCloud), Vienna, Austria, 2016, pp. 301-308, doi: 10.1109/ FiCloud. 2016.50. (Year: 2016).*

\* cited by examiner

Reward Card Transaction Table 448

| Transaction ID | Account No. | Beneficiary Contact | Transaction Timestamp | Card Denom | Card Brand | Source |
|---|---|---|---|---|---|---|
| 00104087 | 2350012 | employee12 @sample... | 2018-01-12 07:15:22 | $100 | Company X | Buffer |
| 00104088 | 2350012 | employee37 @sample... | 2018-01-12 07:17:24 | $200 | Company Y | API |
| ... | ... | ... | ... | ... | ... | ... |

Figure 6A

Funding Account Table 104

| Account No. | Company | Status | Balance |
|---|---|---|---|
| 2350012 | Sample Company | Active | 20,500 |
| 1479388 | Large Company | Inactive | 10 |
| 1972104 | Alpha Company | Suspended | 12,400 |

Figure 6B

Funding Transaction Table 444

| Account No. | Funding Source | Funding Type | Amount | Timestamp |
|---|---|---|---|---|
| 2350012 | Source Bank 1 | Wire | 10,000 | 2018-01-02 08:52:55 |
| 2350012 | Source Bank 2 | ACH | 12,000 | 2018-01-02 08:55:23 |
| 1972104 | VISA | Credit Card | 2,500 | 2018-01-08 14:20:02 |

Figure 6C

Purchase Options 446

| Card Brand | Card Denom | Primary Rate Limit | Secondary Rate Limit | Replenish Threshold | Replenish Size | Replenish Schedule |
|---|---|---|---|---|---|---|
| Company X | $50.00 | 10 TPS | 5 TPS | 20 | 10 | Sun 1-4a |
| Company X | $100.00 | 10 TPS | 5 TPS | 10 | 5 | Sun 1-4a |
| Company X | $200.00 | 10 TPS | 5 TPS | 5 | 3 | Sun 1-4a |
| Company Y | $50.00 | 1 TPS | 0.5 TPS | 10 | 10 | Sat 9-11p |
| Company Y | $100.00 | 1 TPS | 0.5 TPS | 2 | 2 | Sat 9-11p |
| Company Y | $200.00 | 1 TPS | 0.5 TPS | 2 | 2 | Sat 9-11p |
| ... | ... | ... | ... | ... | ... | ... |

Figure 6D

Buffer Stock 124

| Buffer Item ID | Card Denom | Card Brand | Acquired Timestamp | Transaction ID | Transaction Timestamp |
|---|---|---|---|---|---|
| 0131701 | $100.00 | Company X | 2018-01-05 09:13:42 | 00104087 | 2018-01-12 07:15:22 |
| 0131702 | $50.00 | Company Y | 2018-02-15 10:02:55 | 00104126 | 2018-02-19 07:17:24 |
| 0131703 | $200.00 | Company Y | 2018-02-16 11:32:05 | NULL | NULL |
| ... | ... | ... | ... | ... | ... |

Figure 6E

TRIGGERING AND THROTTLING ACCESS TO REWARD CARD SUPPLIER INTERFACES

RELATED APPLICATIONS

This application is a continuation of U.S. application Ser. No. 16/272,941, filed Feb. 11, 2019, entitled "Triggering and Throttling Access to Reward Card Supplier Interfaces," which is a continuation-in-part of U.S. patent application Ser. No. 15/480,296, filed Apr. 5, 2017, entitled "Computer System for Identifying Aberrant Activity on a Reward Card Platform," which is a continuation of U.S. patent application Ser. No. 15/469,293, filed Mar. 24, 2017, entitled "Computer System for Identifying Aberrant Activity on a Reward Card Platform," each of which is incorporated by reference herein in its entirety.

TECHNICAL FIELD

The disclosed implementations relate generally to reward cards and more specifically to systems, methods, and user interfaces that manage buffer stock in the purchasing of reward cards.

BACKGROUND

Use of stored-value instruments has increased dramatically in recent years. Consumers purchase or otherwise obtain stored-value instruments, often in the form of gift cards, and use the monetary value associated with these instruments to purchase goods or services at corresponding merchants. Historically, gift cards provide a restricted monetary equivalent or scrip that is issued by retailers or banks as an alternative to a non-monetary gift.

A gift card is also referred to as a reward card, particularly in the context of a business providing reward cards to its employees or customers. Businesses purchase reward cards to create or strengthen a personal, social, or business relationship with the beneficiaries. In this context, a single benefactor (e.g., a business) may purchase a large number of reward cards, and may purchase a wide variety of reward cards. To facilitate this, a reward card platform may provide a single infrastructure for benefactors to purchase all of the reward cards desired.

A reward card platform includes funding accounts, which simplifies the process of purchasing individual reward cards. For example, a company can fund its account with $5000 as a single funding transaction, then purchase many $50 reward cards for its employees. However, because the reward card platform is provided over the Internet, it is subject to potential transaction delays caused by supplier outages, delivery speed, network reliability issues, and so forth.

SUMMARY

The present disclosure describes features of a reward card platform that eliminates many transaction delays in reward card transactions. The reward card platform maintains "buffer stock," which includes reward card inventory that has been purchased and stored in anticipation of future transactions, thereby ensuring a more robust and efficient transaction process. In addition, the reward card platform dynamically refills the buffer stock according to various supplier-dependent criteria, and dynamically controls buffer stock replenishment according to rate limits that are designed to maximize buffer functionality while minimizing any impact to direct purchasing functionality. For example, when the inventory for a particular supplier (or specific brand/denomination combination) drops below a threshold, the reward card platform replenishes the buffer stock for that supplier at a rate that safeguards the platform's processing bandwidth (e.g., for supporting direct purchases from that supplier), and also safeguarding available processing bandwidth of the supplier itself (e.g., for supplying the inventory to the platform through an application programming interface).

In accordance with some implementations, a computer system implements a reward card platform. The reward card platform includes a database that stores funding accounts, reward card purchase transactions, reward card supplier information, and reward card purchase options. The reward card platform provides a user interface for purchasing reward cards, including user interface controls to specify funding accounts, reward card brand and denomination options, and email addresses for reward card recipients. The user interface is configured to commit reward card purchase transactions with respect to specified funding accounts and specified reward card brand and denomination options for specified reward card recipients. The reward card platform further includes a direct application programming interface (API) module configured to obtain respective reward card items from APIs of a plurality of third party suppliers. The reward card items correspond to the specified reward card brand and denomination options. The reward card platform further includes a buffer storing the reward card inventory items. The reward card platform further includes a provisioning module configured to: (i) select reward card inventory items to complete reward card purchase transactions in accordance with availability of reward card inventory items, in the buffer, having specified brand and denomination options; (ii) invoke the direct API module, according to a primary supplier rate limit, to obtain reward card items having the specified brand and denomination options to complete reward card purchase transactions when reward card inventory items having the specified brand and denomination options are not available in the buffer; and (iii) replenish the buffer with reward card items having the specified brand and denomination options in accordance with secondary supplier rate limits, which are less than corresponding primary supplier rate limits.

In some implementations, for each third party supplier, the provisioning module is configured with a respective primary supplier rate limit in accordance with a respective maximum transactions per second rating specified by the respective third party supplier. In some implementations, for each third party supplier, the provisioning module is configured with a respective secondary rate limit that is a predefined fraction of the respective primary rate limit (e.g., a fraction of 0.50)

In some implementations, the provisioning module is further configured to replenish the buffer in accordance with an internal rate limit. The internal rate limit is determined in accordance with the processing capacity of the provisioning module. In some implementations, the provisioning module is further configured to replenish the buffer in accordance with respective maximum spend thresholds for each third party supplier.

In some implementations, the provisioning module is further configured to forego replenishing the buffer for a given third party supplier for a predefined period of time when replenishment would exceed one or more of: (i) the primary supplier rate limit for the given third party provider; (ii) the secondary supplier rate limit for the given third party provider; (iii) the maximum spend threshold for the given third party provider; or (iv) the internal rate limit for the provisioning module.

In some implementations, the provisioning module is configured to select specified reward card inventory items to complete a reward card purchase transaction by determining availability of the specified reward card inventory items in the buffer. If the specified reward card inventory items are available in the buffer, the provisioning module selects the specified reward card inventory items in the buffer for the reward card purchase transaction. When remaining reward card inventory items in the buffer fall below a threshold quantity, the provisioning module uses the direct API module to obtain additional reward card inventory items from respective third party suppliers to replenish the buffer. If the specified reward card inventory items are not available in the buffer, the provisioning module uses the direct API module to obtain the specified reward card inventory items directly from respective third party suppliers.

In some implementations, the reward card platform includes a recovery module configured to return reward card inventory items to the buffer upon voiding of reward card purchase transactions. In some implementations, the recovery module recovers unused reward card inventory items by (i) tracking the amount of time that has passed since initiating a reward card purchase transaction, and (ii) comparing the amount of time to a configurable threshold. In some implementations, the recovery module returns the unused reward card items to the buffer when the tracked amount of time is greater than the threshold.

In some implementations, the reward card platform includes a buffer size determination module configured to determine, for each reward card inventory item, a respective buffer size based on one or more of: (i) the purchase history corresponding to the respective reward card item; (ii) the supplier performance history of the third party supplier corresponding to the respective reward card item; and (iii) the storage cost of the respective reward card item.

In some implementations, a non-transitory computer-readable storage medium stores one or more programs configured for execution by a computer system having one or more processors, memory, and a display. The one or more programs include instructions for implementing any of the computer systems described herein.

In accordance with some implementations, a method executes at a computer system having a display, one or more processors, and memory storing one or more programs configured for execution by the one or more processors, thereby implementing any of the computer systems described herein.

Thus methods, systems, and graphical user interfaces are disclosed that provide a reward card platform, and manage buffer stock on the platform.

BRIEF DESCRIPTION OF THE DRAWINGS

For a better understanding of the aforementioned systems, methods, and graphical user interfaces, as well as additional systems, methods, and graphical user interfaces that provide a reward card platform, reference should be made to the Description of Implementations below, in conjunction with the following drawings in which like reference numerals refer to corresponding parts throughout the figures.

FIGS. 6A-6E are skeletal data structures that store data used to manage buffer stock inventory in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
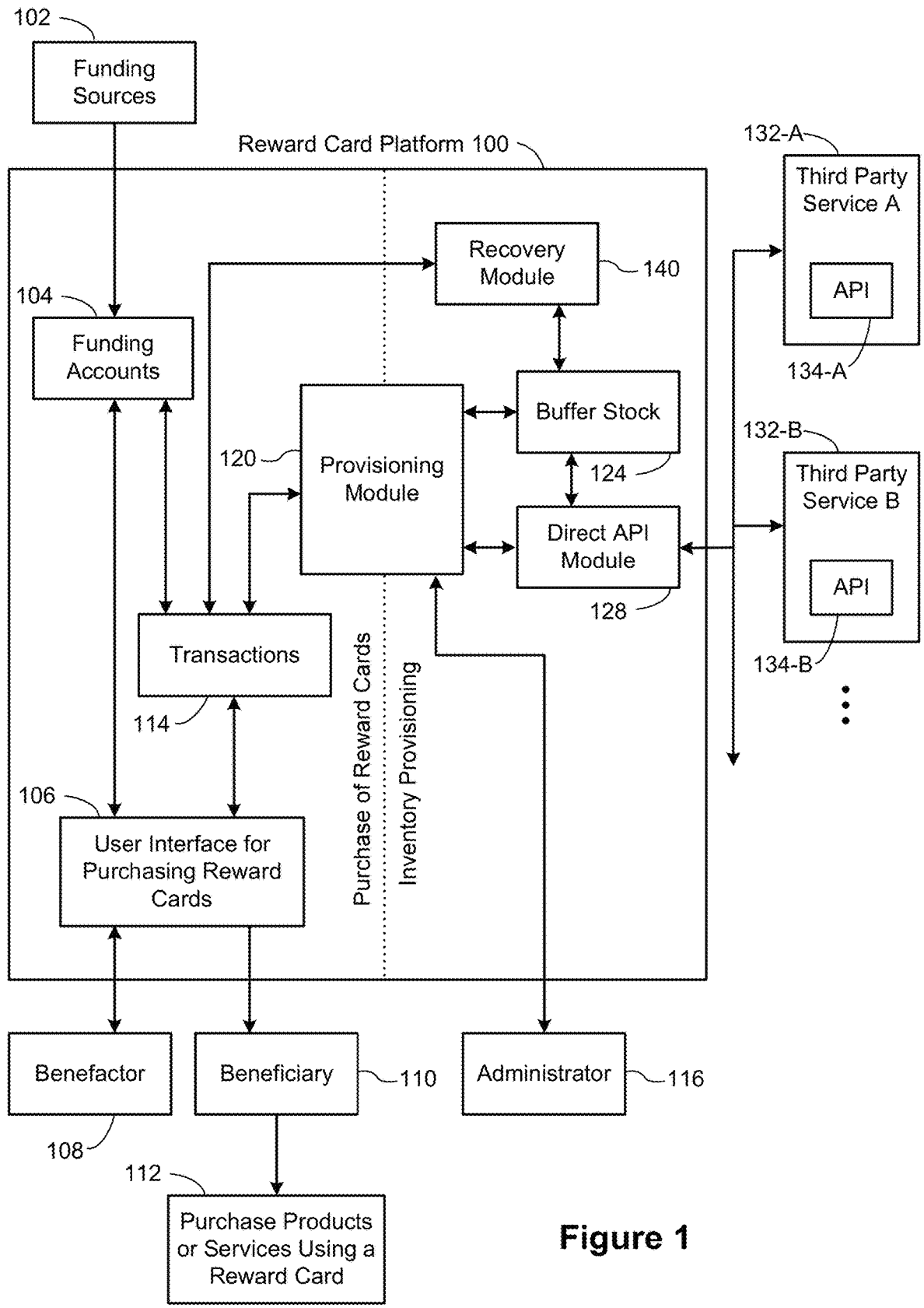
FIG. 1 illustrates some elements of a reward card platform and a context in which it is used in accordance with some implementations.

FIG. 1 illustrates some elements of a reward card platform 100 and a context in which it is used in accordance with some implementations. On the left-hand side of the reward card platform 100 in FIG. 1 are elements involved in purchasing reward cards. On the right-hand side are elements used in managing inventory related to those purchases. In the middle is the provisioning module 120, which is a module that determines whether to fulfill a transaction 114 through buffer stock 124, or through the direct API module 128. The provisioning module 120 is described in more detail below with reference to FIG. 2.

Reward cards are purchased using money in a funding account 104. The structure of the funding accounts 104 is described in more detail below in FIG. 6B. As illustrated in FIG. 1, the funds in the funding account can come from a variety of funding sources 102. For example, a funding account can be funded through wire transfer, ACH, a credit or debit card, or other electronic transfer processes. Some implementations also allow for funds deposited by check. In some instances, a benefactor 108 maintains a non-zero balance in a funding account 104. In some instances, a benefactor 108 transfers funds into a funding account immediately prior to a reward card campaign so that funds are in the funding account 104 for a short window of time. In some implementations, each funding event has an associated funding transaction stored in a funding transaction table 444, as illustrated in FIG. 6C. In some implementations, the reward card platform 100 provides a user interface for initiating funds transfers into funding accounts 104.

Figure 5:
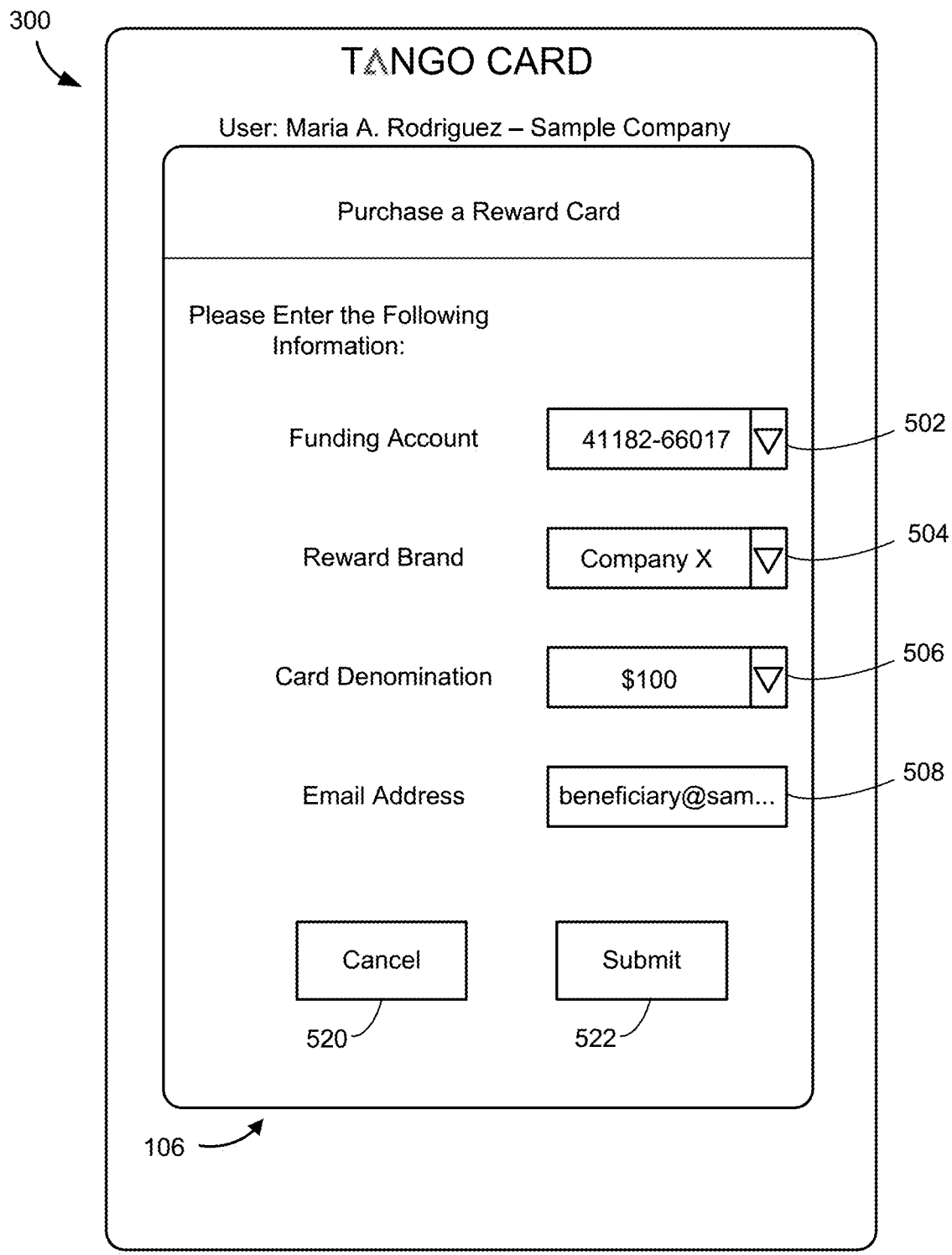
FIG. 5 is a simplified example of a user interface for purchasing reward cards in accordance with some implementations.

The reward card platform 100 provides a user interface 106 for purchasing reward cards, which may be implemented as a web application (e.g., in the cloud) or as a downloaded application that runs locally on a client device 300 of the benefactor 108. A simplified example of a purchasing interface is illustrated in FIG. 5. The benefactor 108 interacts with the purchasing user interface 106 to specify what cards are being purchased (e.g., brand and monetary amount) as well as who is receiving the reward card (e.g., specifying a beneficiary 110 using an email address or cell phone number). In some implementations, the benefactor 108 can specify a list of beneficiaries 110 at one time rather than going through the process one-by-one. In some implementations, the reward card platform 100 provides an application user interface (API) so that an external system (such as an enterprise HR system) can purchase reward cards as a batch and initiate the purchase from the external system (e.g., using a web service). Each purchase creates a transaction 114, and the transactions are typically stored in a transaction table 448. After a reward card is transmitted to a beneficiary 110, the beneficiary 110 can use the reward card to purchase (112) products or services.

The provisioning module 120, described in more detail with reference to FIG. 2 below, determines whether to fulfill transaction items through buffer stock 124, or through a direct API module 128. The direct API module 128 procures reward cards by interfacing with APIs 134 (e.g., APIs 134-A and 134-B) of third party services 132 (e.g., suppliers 132-A and 132-B). The direct API module 128 supplies reward cards during live transactions, and also saves reward card inventory in the buffer stock 124 for future transactions. The recovery module 140 recovers unused reward card items and stores the recovered reward card items in the buffer stock 124. The provisioning module 120 is configurable. An administrator 116 for a company typically manages the configuration parameters.

Figure 2:
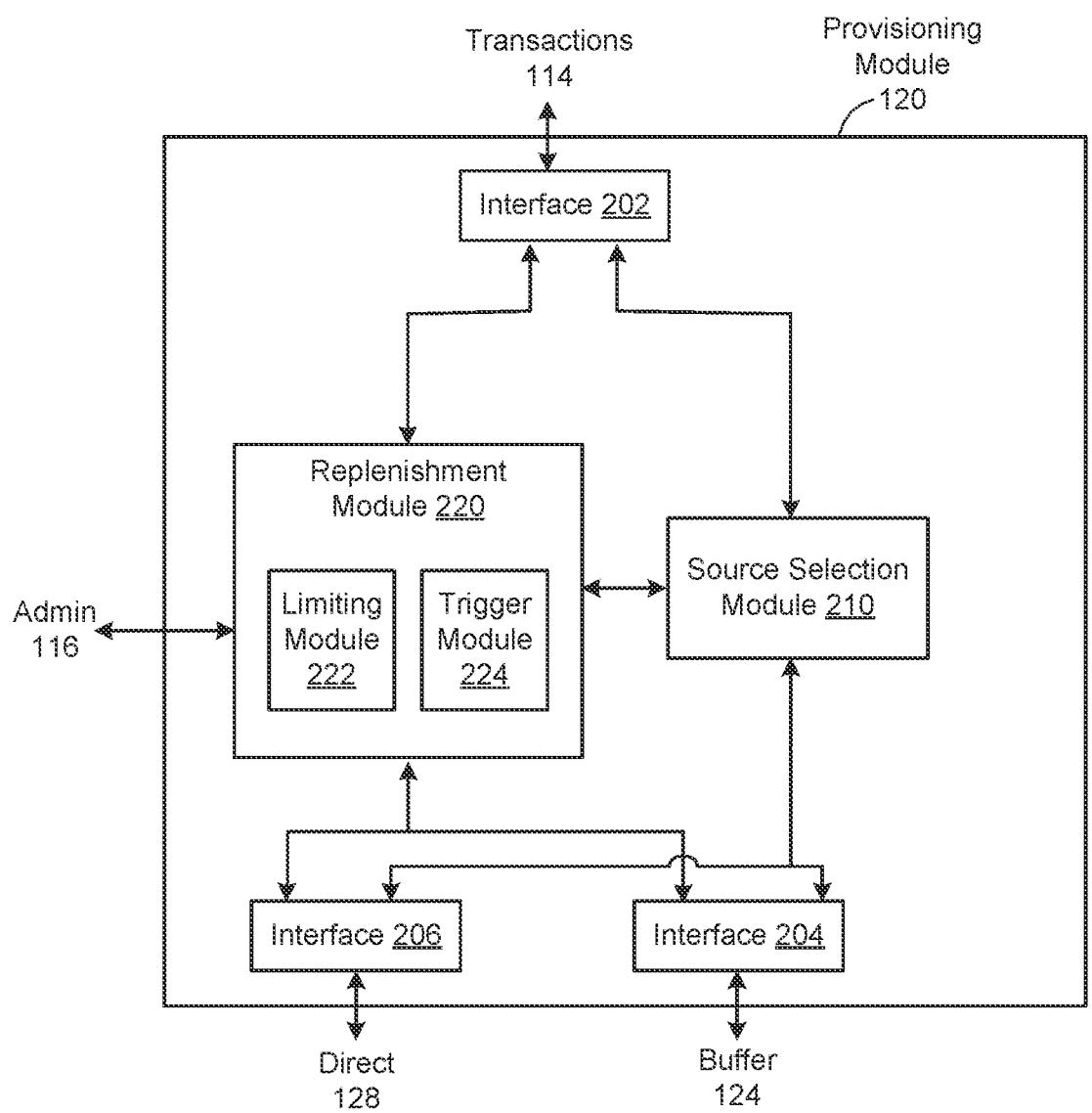
FIG. 2 is a detailed view of the provisioning module of FIG. 1 in accordance with some implementations.

FIG. 2 is a block diagram of the provisioning module 120 in accordance with some implementations. The provisioning module 120 includes a source selection module 210 for checking the buffer 124 for requested inventory, and for acquiring the reward card items from the buffer 124 or from the API module 128. The provisioning module also includes a replenishment module 220 for replenishing the buffer 124 by acquiring reward card items from the API module 128. The replenishment module 220 includes a limiting module 222 for governing replenishment rates, based in part on the rate of transactions 114 and configurable rate thresholds. The replenishment module 220 also includes a trigger module 224 for governing replenishment thresholds and replenishment schedules. In some implementations, the provisioning module 120 acquires reward card items from the buffer 124 through a buffer interface 204, and acquires reward card items from the API module 128 through an API interface 206. In some implementations, the provisioning module receives transaction requests 114 and remits transaction inventory through a transaction interface 202.

In some implementations, replenishment is triggered by purchase transactions (e.g., after a transaction is complete), or by a timer or calendar. For example, replenishment may be scheduled daily during off peak hours. In addition, replenishment may be triggered based on transaction size (e.g., a benefactor 108 purchases a large batch of reward cards). The triggering thresholds for real-time replenishment and scheduled replenishment may be different. For example, the trigger module 224 may trigger real-time replenishment when the buffer stock 124 for a specific brand and/or denomination falls below a first value (e.g., 5). Additionally or alternatively, the trigger module 224 may trigger a scheduled off-peak replenishment when the buffer stock 124 for the specific brand or denomination falls below a second value (e.g., 10), which is typically higher than the first value. An administrator 116 can configure these options.

Figure 3:
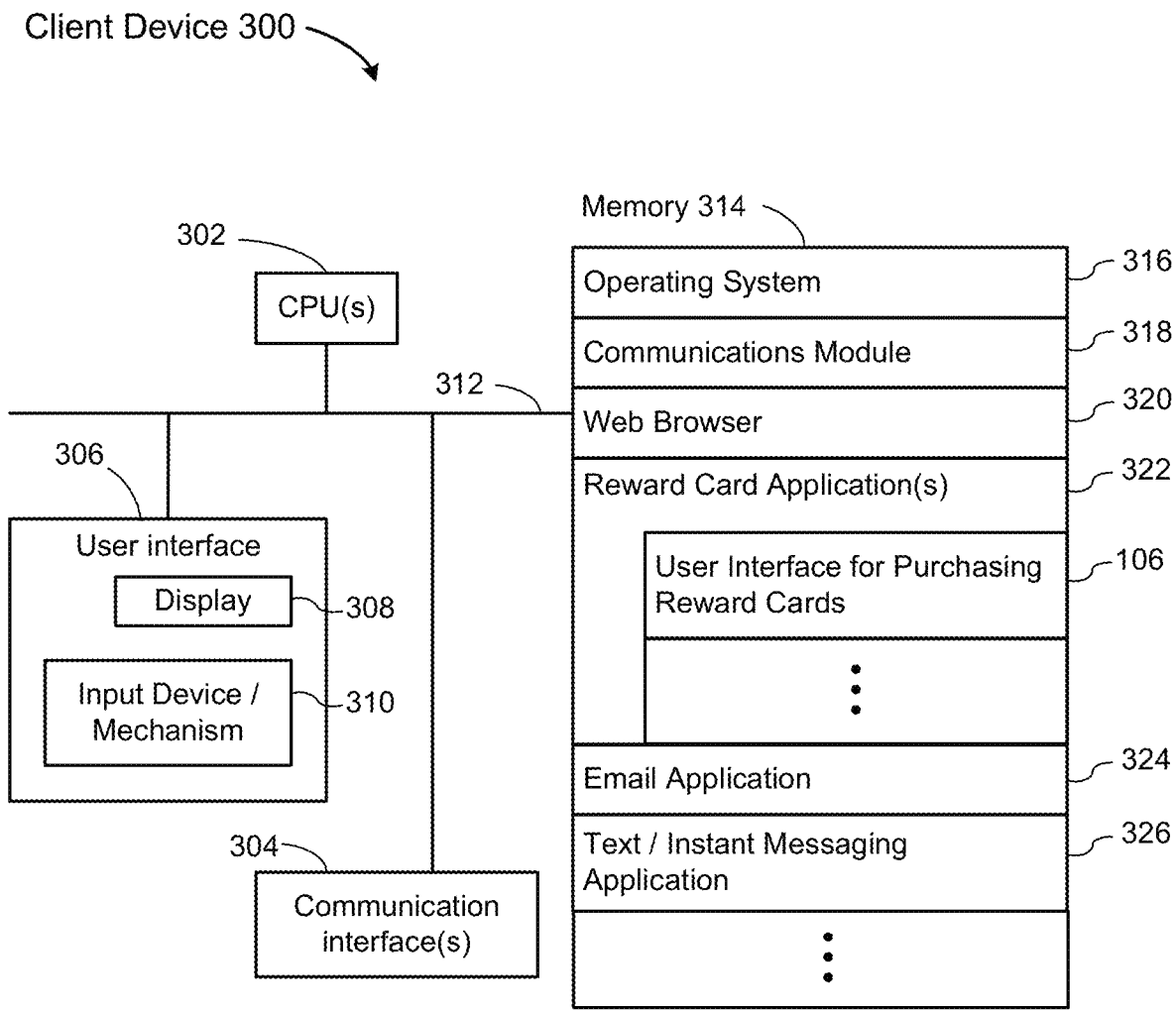
FIG. 3 is a block diagram of a client device according to some implementations.

FIG. 3 is a block diagram illustrating a client device 300 that can display the graphical user interface 106 of a reward card platform 100 in accordance with some implementations. A client device is also referred to as a computing device, a user device, or a computer. Various examples of a client device 300 include a desktop computer, a laptop computer, a tablet computer, a hand-held device, a smart mobile phone, and other computing devices that have a display and a processor capable of running a reward card application 322. The client device 300 typically includes one or more processing units/cores (CPUs) 302 for executing modules, programs, and/or instructions stored in the memory 314 and thereby performing processing operations; one or more network or other communications interfaces 304; memory 314; and one or more communication buses 312 for interconnecting these components. The communication buses 312 may include circuitry that interconnects and controls communications between system components.

The client device 300 includes a user interface 306 comprising a display device 308 and one or more input devices or mechanisms 310. In some implementations, the input device/mechanism includes a keyboard. In some implementations, the input device/mechanism includes a "soft" keyboard, which is displayed as needed on the display device 308, enabling a user to "press keys" that appear on the display 308. In some implementations, the display 308 and input device/mechanism 310 comprise a touch screen display (also called a touch sensitive display).

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory devices within the memory 314, comprises a non-transitory computer readable storage medium. In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the computing device 300 to other computers and devices via the one or more communication network interfaces 304 (wired or wireless) and one or more communication networks, such as the Internet, other wide area networks, local area networks, metropolitan area networks, and so on;
- a web browser 320 (or other application capable of displaying web pages), which enables a user to communicate over a network with remote computers or devices;
- a reward card application 322, which provides one or more graphical user interfaces 106. A user, such as a benefactor 108, uses the purchasing user interface 106 in order to purchase reward cards for one or more beneficiaries 110. An example user interface 106 is illustrated in FIG. 5. In some implementations, the reward card application 322 is implemented as a set of web pages and accessed by the web browser 320;
- an email application 324, which enables the user of the client device 300 to receive and send email; and
- a text or instant messaging application 326, which enables the user to send and receive text messages and/or instant messages.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a client device 300, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
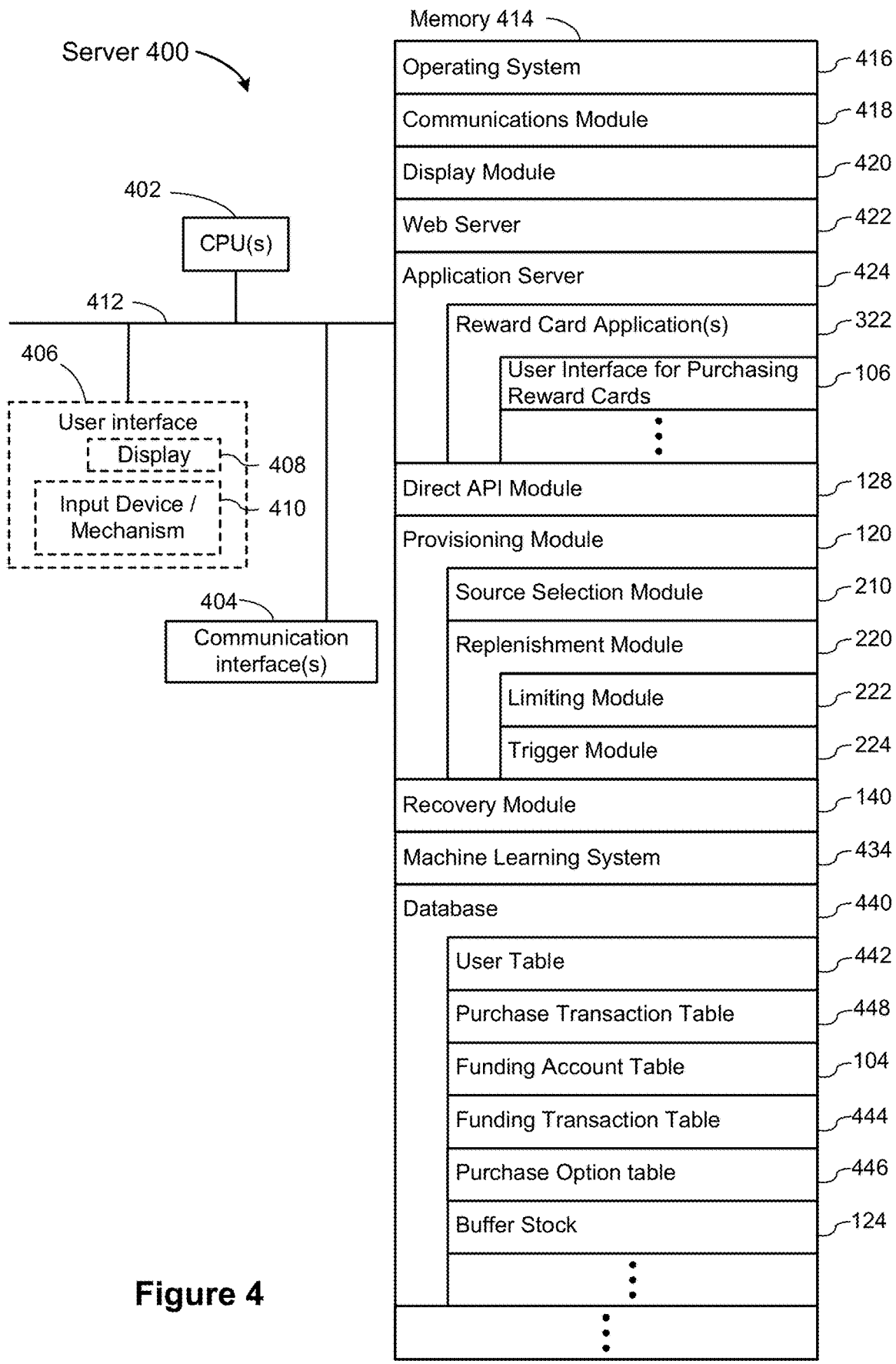
FIG. 4 is a block diagram of a server according to some implementations.

FIG. 4 is a block diagrams illustrating a server 400 that may be used in a server system for implementing a reward card platform 100. A typical server system includes many individual servers 400, which may be hundreds or thousands. A server 400 typically includes one or more processing units (CPUs) 402 for executing modules, programs, or instructions stored in the memory 414 and thereby performing processing operations; one or more network or other communications interfaces 404; memory 414; and one or more communication buses 412 for interconnecting these components. The communication buses 412 may include circuitry (sometimes called a chipset), which interconnects and controls communications between system components. In some implementations, a server 400 includes a user interface 406, which may include a display device 408 and one or more input devices 410, such as a keyboard and a mouse.

In some implementations, the memory 414 includes high-speed random access memory, such as DRAM, SRAM, DDR RAM or other random access solid state memory devices. In some implementations, the memory 414 includes non-volatile memory, such as one or more magnetic disk storage devices, optical disk storage devices, flash memory devices, or other non-volatile solid state storage devices. In some implementations, the memory 414 includes one or more storage devices remotely located from the CPU(s) 402. The memory 414, or alternatively the non-volatile memory devices within memory 414, comprises a non-transitory computer readable storage medium. In some implementations, the memory 414, or the computer readable storage medium of memory 414, stores the following programs, modules, and data structures, or a subset thereof:

an operating system 416, which includes procedures for handling various basic system services and for performing hardware dependent tasks;

a communications module 418, which is used for connecting the server 400 to other computers via the one or more communication network interfaces 404 (wired or wireless) and one or more communication networks, such as the Internet, other wide area networks, local area networks, metropolitan area networks, and so on;

a display module 420, which receives input from one or more input devices 410, and generates user interface elements for display on a display device 408;

one or more web servers 422, which receive requests from client devices 300, and return responsive web pages, resources, or links. In some implementations, each request is logged in the database 440;

one or more application servers 424, which provide various applications (such as a reward card application 322) to the client devices 300. In some instances, applications are provided as a set of web pages, which are delivered to the client devices 300 and displayed in a web browser 320. The web pages are delivered as needed or requested. In some instances, an application is delivered to a client device 300 as a download, which is installed and run from the client device 300 outside of a web browser 320. In some implementations, the provided reward card application 322 includes a purchasing user interface 106, as illustrated below in FIG. 5;

a direct API module 128, which directly obtains reward card inventory items from third party APIs 134 of respective third party companies 132. In some implementations, the direct API module 128 obtains reward card items by identifying a URL for the API corresponding to the needed item, specifying the parameters for the API call, and receiving the needed item. In some implementations, the direct API module 128 receives the needed items from the third party supplier 132 in the form of a list of reward card numbers;

a provisioning module 120, which supplies requested reward card items, either from buffer stock 124 or through the direct API module 128. The provisioning module 120 also replenishes the buffer stock 124 in accordance with the following sub-modules:
  source selection module 210, which determines whether the requested reward card items are available in the buffer stock 124, and selects the source of the requested items according to the determination;
  replenishment module 220, which replenishes the buffer stock 124, in accordance with a rate limiting module 222 and a trigger module 224, as described above in FIG. 2;

a recovery module 140, which "recovers" extra reward card items that occur due to abnormal circumstances during a purchase transaction (e.g., a reward card is acquired from the third party supplier, but the transaction is not committed due to a network error). The recovery module places the unused item into the buffer stock 124 for reissuing as part of a future transaction, thereby reducing waste and saving money. In some implementations, items can be returned to the buffer when transactions are voided. Items can also be recovered and placed in the buffer for other reasons. For example, based on a reward card transaction, the provisioning module may attempt to use the direct API module to obtain a reward card item from a supplier. However, due to a temporary network glitch or hiccup, the attempt may not work. As a result, the provisioning module initiates a subsequent attempt to obtain the reward cart item from the supplier. In the meantime, the first attempt finally comes through, causing the reward card platform 100 to have an extra reward card item. For situations in which the platform 100 cannot return, or otherwise reverse, the extra reward card items with the supplier, the recovery module 140 places the extra items into the buffer 124;

a machine learning system 434, which uses historical purchasing data to adjust the rate limits used by the limiting module 222; and one or more databases 440, which store data used by the reward card platform 100. In some implementations, the databases include one or more relational databases (e.g., SQL databases), spreadsheet files, flat (ASCII) file, CSV files, desktop databases, or distributed non-relational database, such as noSQL. The one or more databases 440 include a users table 442, which identifies the set of users who have access to the reward card platform 100 and identifies their access rights (e.g., specific funding accounts). The databases 440 also include a purchase transactions table 448 (as described in FIG. 6A), a funding account table 104 (as described in FIG. 6B), a funding transaction table 444 (as described in FIG. 6C), a purchase options table 446 (as described in FIG. 6D), and a buffer stock table 124 (as described in FIG. 6E).

Each of the above identified elements in FIG. 4 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 414 stores a subset of the modules and data structures identified above. Furthermore, the memory 414 may store additional modules or data structures not described above.

Although FIG. 4 illustrates a server 400, FIG. 4 is intended more as a functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

FIG. 5 is a simplified example of a user interface 106 for purchasing reward cards in accordance with some implementations. The purchase interface 106 is displayed on a client device 300, such as a smart phone. Based on the user's access privileges, the user has access to a limited number of funding accounts (e.g., one). When the user has access to a single funding account, some implementations default to selecting that one account.

In some implementations, the purchasing interface 106 includes a funding account selection control 502, which enables the user to select among multiple accounts. In addition, the purchasing interface 106 prompts the user to select a brand or other card type. In some instances, a reward card corresponds to a single company (e.g., Amazon®), but in other cases, a reward card can be used for purchases at a variety of merchants. The interface 106 provides a brand selection control 504 to select the brand. The interface also provides a denomination selection control 506 for the user to specify a denomination for the reward card. The interface 106 also enables the user to specify one or more beneficiaries 110 using one or more beneficiary selection controls 508. In some implementations, the user can enter a list of email addresses, separated by commas or semicolons. Some implementations validate the entered email addresses to make sure they have the proper format. In some implementations, the reward card system stores a list of previous beneficiaries and/or potential beneficiaries in the databases 440, which facilitates beneficiary selection.

The purchase interface 106 also includes a cancel control 520 and a submit control 522, enabling the user to cancel or complete the purchase transaction.

In some implementations, the purchase interface validates the data and/or limits the selections based on stored reward card purchase options 446. For example, the company "Sample Company" may limit reward card purchases to cards with a face value not exceeding $50 and may specify a list of allowed brands. For example, a clothing retailer may not allow purchasing of reward cards for other clothing retailers. Implementations typically validate the available balance in the funding account as well. For example, if the funding account has $400, and the user attempts to purchase twenty $100 reward cards, the purchase will be rejected.

FIGS. 6A-6E are skeletal data structures that store reward card data and transaction data in accordance with some implementations.

FIG. 6A identifies some of the data fields in the transaction table 448, which logs transactions corresponding to the purchase of reward cards. The transaction ID field 602 specifies a unique identifier for each purchase transaction. The account number field 604 specifies the funding account for the transaction. Each transaction has contact information for the beneficiary, which is typically the beneficiary email address 606. In some implementations, the contact information can include an IP address, phone number, or other unique address, such as the MAC address of a device. Each transaction stores a transaction timestamp 608. Each transaction also specifies the denomination 610 or monetary value of the reward card. In general, the denomination 610 is limited to a small set of predetermined values. Each transaction also stores the card brand 612. In some implementations, each transaction stores the source 614 for the transaction, which specifies whether the reward card was acquired directly through an API of a third party supplier or acquired from the buffer stock 124.

FIG. 6B identifies some of the data fields in the funding account table 104. The funding account table 104 includes account numbers 622. In some implementations, the funding account table 104 also enables a user to specify an account name that is meaningful to the user. The funding account table also tracks the current balance 628 in the account. In some implementations, the funding account table 104 includes a status field 626, which identifies the current state of the account. For example, the three rows illustrated in FIG. 6B show statuses of Active, Inactive, and Suspended. In these examples, the "Suspended" status 630 indicates that transactions on the account are currently suspended based on an aberrant activity alert. No additional transactions will be permitted until the problem is resolved. In some implementations, a status of "Inactive" indicates that a user has voluntarily chosen to discontinue activity on an account. Functionally this is essentially the same as "suspended," because both of these status values prevent transactions on the account. In some implementations, the funding account table also includes a company field 624, which specifies the name of the relevant company. Some implementations enforce that an account is associated with a unique company (or "owner," which can be a person). Note, however, that a single company generally may have multiple funding accounts.

FIG. 6C identifies some of the data fields in the funding transaction table 444. Whereas the purchase transaction table 448 tracks money going out of a funding account (into a reward card for a beneficiary), the funding transaction table 444 tracks money that comes into a funding account from an external funding source 102. Each funding transaction includes the account number 642 of the funding account that is receiving the funds, as well as a monetary amount 648 and a timestamp 650, which specifies when the transaction occurred. The funding transaction table typically tracks the funding source 644 (e.g., the specific bank or financial institution) as well as the funding type 646 (e.g., the method used to transfer the funds). In some implementations, the funding source field 644 specifies bank routing numbers, such as a nine-digit ABA routing number. In some implementations, the funding types include Wire, ACH, Credit Card, and Check. In some implementations, the purchase transaction table 448 and the funding transaction table 444 are combined into a single table, which tracks all activity for funding accounts.

FIG. 6D identifies some of the data fields in the purchase options table 446. The purchase options include every combination of reward card brand 662 and denomination 664 available for purchase by a benefactor 108. In some implementations, a single third party company 132 is associated with more than one brand. Alternatively, a single third party company 132 may be associated with only one brand.

In some implementations, each unique purchase option is associated with a primary rate limit 666, defined by the third party 132 as the maximum purchase rate (e.g., in transactions per second) that can be accommodated by the respective third party API 134. This protects third party suppliers from having traffic volume that exceeds their capabilities.

In some implementations, each unique purchase option is associated with a secondary rate limit 668, which is used by the limiting module 222 during replenishment. In some implementations, the secondary rate limit 668 is less than the primary rate limit 666, thereby ensuring that the third party API 134 has bandwidth to fulfill direct API orders. For example, if Company X is capable of fulfilling 10 transactions per second (TPS), then setting the secondary rate limit to 5 TPS ensures than even if the replenishment module 220 is replenishing the buffer stock 124 at the maximum rate of 5 TPS, there will be an additional 5 TPS available for direct API purchases. This ensures that buffer replenishment does not delay direct API purchases. In some implementations, the primary and/or secondary rate limits are set on a per company basis. In some implementations, the primary and/or secondary rate limits are set on a per purchase option basis, depending on the capabilities of the third party. While the examples described above set the secondary rate limit to one half of the primary rate limit, any other fraction may be used, as long as the secondary rate is lower than the primary rate. This ensures enough processing bandwidth for direct purchases (e.g., in situations when the buffer is empty or otherwise cannot fulfill the entire order). The secondary rate limit prevents replenishment operations from slowing down real time purchase wait times, by always reserving a portion of the third party supplier's bandwidth for direct API purchases.

In some implementations, each unique purchase option is associated with a replenishment threshold 670, a replenishment size 672, and/or a replenishment schedule 674. When the number of items of a particular purchase option drops down to the replenishment threshold 670, the trigger module 224 causes the replenishment module 220 to purchase more items of that particular purchase option. The number of items to be purchased is the replenishment size. For example, referring to FIG. 6D, when the buffer has less than twenty $50 reward cards left for Company X, the replenishment module 220 purchases ten more $50 reward cards for Company X, and stores each item in the buffer stock 124. In some implementations, the replenishment module 220 operates in accordance with a replenishment schedule 674. In some implementations, the schedule limits times available for replenishment to certain times, days, weeks, and/or months. This ensures that the replenishment module 220 only uses processing resources during off-peak times. In some implementations, replenishment is subject solely to the thresholds 670. However, the schedule 674 may include time periods during which higher or lower thresholds and/or higher or lower sizes supersede the thresholds and/or sizes that are configured for times outside of the scheduled time period. This allows the replenishment module 220 to replenish the buffer stock whenever it is necessary (e.g., due to thresholds being met), while allowing the replenishment module 220 to use more processing resources during off-peak time periods. In some implementations, for items that the administrator 116 does not wish to buffer, the threshold 670 and size 672 are set to zero.

In some implementations, the replenishment module 220 determines the replenishment size 672 (or alternatively, a target buffer size) for a particular item based on a purchase history, or current purchase activity, of the item. For example, if there is a campaign for a particular item, the provisioning module 220 may increase the replenishment size and/or the buffer size in order to ensure that the particular item is sufficiently stocked during the campaign. In some implementations, determining the replenishment size and/or the buffer size for a particular item is based on supplier performance history with respect to the particular item. For example, if the supplier has a history of taking longer than usual to supply a particular item (e.g., due to vendor outages, delivery speed, reliability issues, and so forth), the provisioning module 220 may increase the replenishment size and/or the buffer size in order to account of expected supplier delays. In some implementations, determining the replenishment size and/or the buffer size for a particular item is based on storage cost of the particular item. For example, expensive rewards (e.g., $500 gift cards) or large quantities of individual rewards can be expensive to store because they tie up capital resources. The provisioning module 220 may decrease the replenishment size and/or the buffer size for items with denominations or quantities that are over predetermined thresholds.

FIG. 6E identifies some of the data fields in the buffer stock table 124, which includes buffered reward card inventory (also referred to herein as "buffer stock"). Each inventory item includes a unique identifier 682 for the buffer item, a card denomination 684, a card brand 686, and an acquisition timestamp 688 indicating when the item was acquired from the third party supplier. When an inventory item is used to fulfill a purchase transaction by a benefactor 108, the item includes a transaction ID 690 for the corresponding purchase transaction, and a transaction timestamp 692 indicating when the item was used to fulfill the purchase transaction. An unused inventory item (not yet used to fulfill a purchase transaction) has blanks or NULLs for the transaction ID 690 and the transaction timestamp 692.

In some implementations, the buffer stock table 124 includes additional or different data fields. In some implementations, the buffer stock table 124 uses a reward_id field to specify a specific reward, which uniquely identifies a brand/denomination combination. In some implementations, the buffer stock table includes a status field, which specifies whether the reward card corresponding to the row is available, used (e.g., ordered), purged, or in another state. In some implementations, the buffer stock table 124 includes a supplier_id field, which specifies which third party supplier provided the reward card item. In some implementations, the records in the buffer stock table 124 are categorized into queues (e.g., one queue for each brand and denomination combination). When there are queues, the buffer stock table 124 includes a queue_id to specify the queue. In some implementations, the items in a buffer queue are selected to fulfill reward card requests according to the order in which they were inserted into a queue. In some implementations, this ordering is provided by the Acquired Timestamp field 688. Some implementations use an additional field in the buffer stock table to specify the order.

In some implementations, there is a one-to-one correspondence between queues and brand/denomination combinations. However, some brand/denomination combinations may have no queue at all (e.g., combinations that are rarely used). Conversely, some implementations allow multiple queues for a single brand/denomination combination. This can be useful, for example, to support greater parallelism and/or distributed processing.

Some implementations that subdivide the buffer stock into queues also have a Queues table. The Queues table has a single row for each of the queues. In some implementations, the Queues table includes: (i) a queue_id, which is a unique identifier for each queue; (ii) one or more fields that specify the supplier and how to replenish the queue (e.g., a URL for the supplier API); (iii) a replenishment limit so that the buffer does not get too large; (iv) other replenishment parameters; (v) a status of the queue (e.g., active, inactive, depleting, or deleted); (vi) a brand and/or denomination for the queue.

Figure 7:
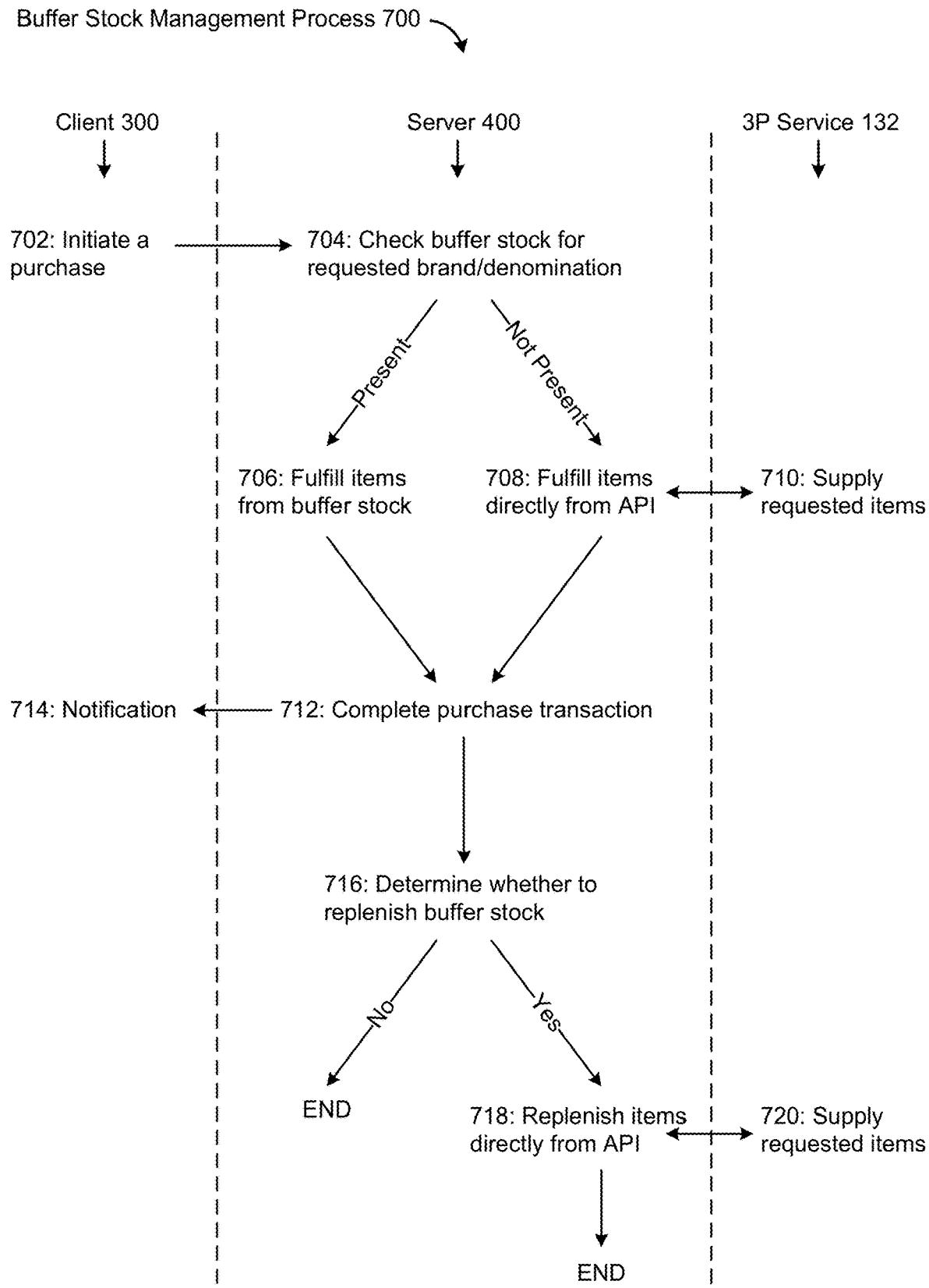
FIG. 7 is a flow diagram illustrating a process of managing buffer stock inventory in accordance with some implementations.

FIG. 7 is a flow diagram of a buffer stock management process 700 in accordance with some implementations. The process is performed at a server 400, a client device 300, and a third party service 132. In some implementations, the server, the client device, and the third party service each includes one or more programs storing instructions for performing the process 700. In some implementations, the programs are stored on non-transitory computer-readable storage media.

The process 700 begins when a benefactor 108 initiates (702) a purchase on the client device 300. The client device 300 transmits a request for reward card items, including brand and denomination information, to the server 400. The source selection module 210 of the server checks (704) the buffer stock 124 for the requested items (e.g., the requested brand and denomination combinations).

If the requested items are present in the buffer 124, the source selection module 210 fulfills (706) the request using items from the buffer stock, designating the relevant buffer items as used. The transaction module 114 then completes (712) the purchase transaction, as described below.

If the requested items are not present in the buffer 124, the source selection module 210 fulfills (708) the request using the direct API module 128, obtaining the items directly from the third party service's API 134. In some implementations, the direct API module 128 obtains the items by identifying a URL for the API corresponding to the needed items, specifying the parameters for the API call (e.g., quantities, denominations, and payment information), and transmitting a request to the third party API 134. The third party service 132, using its API 134, returns (710) a list of reward card items (including a unique identifier for each reward card item) in accordance with the request. The provisioning module 120 then completes (712) the purchase transaction by assigning (or otherwise making available) the purchased items to a specified beneficiary 110. The reward card platform 100 sends a communication to the device 300 of the benefactor regarding the completed transaction, and the device 300 displays (714) the notification.

The replenishment module 220 determines (716) whether to replenish the buffer stock. In some implementations, this determination is made in accordance with replenishment thresholds 670, replenishment sizes 672, and replenishment schedules 674 as described above.

If the replenishment module 220 determines that the buffer 124 does not need to be replenished, the process is finished.

If the replenishment module 220 determines that the buffer 124 does need to be replenished, the replenishment module 220 proceeds to replenish the buffer by acquiring (718) the necessary items from the relevant third party API, which then supplies (720) the requested items as described above. In some implementations, the replenishment operation occurs in accordance with a secondary rate limit 668 as described above. In some implementations, this replenishment operation is made in accordance with an internal rate limit based on processing capacity of the server 400, and/or based on processing capacity available to the replenishment module 220. This prevents replenishment operations from overwhelming other services provided by the server 400. Upon receiving the requested items from the third party API, the replenishment module 220 adds them to the buffer stock 124 (as described in FIG. 6E). Upon completion of the replenishment operation, the process is finished.

In some instances, the determination of whether to replenish is performed immediately upon completion of the transaction. In other instances, the determination of whether to replenish occurs later according to a schedule. Some implementations have two replenishment thresholds for each brand/denomination combination. The first threshold is used by a scheduled operation (e.g., in off-peak hours), and the second threshold is used to trigger immediate replenishment in conjunction with a transaction. For example, for a certain brand/denomination combination, the first threshold may be 10 (for scheduled replenishment) whereas the second threshold is 3 (for immediate replenishment). In this way, most replenishment can be performed on an off-peak schedule, with a limited amount of replenishment in real time if the buffers get too low.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer system having one or more processors and memory, implementing a reward card platform, comprising:
   a database storing funding accounts, reward card purchase transactions, reward card brand options, and reward card denomination options;
   a user interface for purchasing reward cards from a plurality of third party suppliers, including user interface controls to specify funding accounts, brand and denomination options, and email addresses for reward card recipients, wherein the user interface is configured to commit reward card purchase transactions with respect to specified funding accounts and specified brand and denomination options for specified reward card recipients;
   a direct application programming interface (API) module configured to obtain reward card items from APIs of the plurality of third party suppliers, wherein the reward card items correspond to specified brand and denomination options;
   a buffer storing reward card inventory items; and
   a provisioning module configured to:
      (i) select reward card inventory items to complete reward card purchase transactions in accordance with availability of reward card inventory items, in the buffer, having specified brand and denomination options;
      (ii) invoke the direct API module, according to a primary supplier rate limit, to obtain reward card items having the specified brand and denomination options to complete reward card purchase transactions when reward card inventory items having the specified brand and denomination options are not available in the buffer; and
      (iii) replenish the buffer with reward card items having the specified brand and denomination options in accordance with an internal rate limit determined according to processing capacity of the provisioning module and secondary supplier rate limits, which are less than corresponding primary supplier rate limits.

2. The computer system of claim 1, wherein, for each third party supplier, the respective primary supplier rate limit corresponds to a respective maximum transactions per second rating specified by the respective third party supplier.

3. The computer system of claim 2, wherein, for each third party supplier, the respective secondary rate limit that is a predefined fraction of the respective primary rate limit.

4. The computer system of claim 1, wherein the provisioning module is further configured to replenish the buffer in accordance with a respective maximum spend threshold for each third party supplier.

5. The computer system of claim 1, wherein the provisioning module is further configured to forego replenishing the buffer for a given third party supplier for a predefined period of time when replenishment would exceed one or more of:
   (i) a primary supplier rate limit for the given third party provider;
   (ii) a secondary supplier rate limit for the given third party provider;
   (iii) a maximum spend threshold for the given third party provider; and
   (iv) an internal rate limit for the provisioning module.

6. The computer system of claim 1, wherein the provisioning module is configured to complete a reward card purchase transaction for a specified reward card item by:
   determining availability of the specified reward card item in the buffer;
   in accordance with a determination that the specified reward card item is available in the buffer:
      selecting a reward card inventory item in the buffer for the reward card purchase transaction; and
      when remaining reward card inventory items in the buffer fall below a threshold quantity, using the direct API module to obtain additional reward card items from a third party supplier according to the secondary supplier rate limit for the third party provider to replenish the buffer; and
   in accordance with a determination that the specified reward card item is not available in the buffer:
      using the direct API module to obtain the specified reward card item directly from the respective third party supplier according to the primary supplier rate limit for the third party provider.

7. The computer system of claim 1, further comprising a recovery module configured to return reward card inventory items to the buffer upon voiding of reward card purchase transactions.

8. The computer system of claim 1, further comprising a recovery module configured to insert a reward card record into the buffer when duplicate reward cards are acquired from a single third party provider for a single transaction.

9. The computer system of claim 1, further comprising a buffer size determination module configured to determine, for each reward card brand/denomination combination, a respective buffer size based on one or more of:
   a purchase history corresponding to the respective brand/denomination combination;
   a supplier performance history of a third party supplier corresponding to the respective brand/denomination combination; and
   a storage cost of the respective brand/denomination combination.

10. A method for managing buffer stock, performed at a computer system having one or more processors and memory, the method comprising:
   storing funding accounts, reward card purchase transactions, reward card brand options, denomination options, and a buffer of reward card inventory items in the memory;
   providing a user interface to a client device for purchasing reward cards from a plurality of third party suppliers, including user interface controls to specify funding accounts, reward card brand and denomination options, and email addresses for reward card recipients, wherein the user interface is configured to commit reward card purchase transactions with respect to specified funding accounts and specified reward card brand and denomination options for specified reward card recipients;
   receiving a request from the client device to purchase a reward card for a first reward card brand and having a first denomination;
   determining whether the buffer has a reward card for the first reward card brand having the first denomination;
   in accordance with a determination that the buffer does not have a reward card for the first reward card brand and having the first denomination, invoking an API of the third party supplier to obtain a reward card having the first reward card brand and first denomination, in accordance with a primary supplier rate limit; and
   in accordance with a determination that the buffer does have a reward card for the first reward card brand and having the first denomination, (i) selecting a reward card inventory item from the buffer to complete the received request, and (ii) invoking the API of the third party provider to replenish the buffer with one or more reward cards having the first reward card brand and the first denomination, in accordance with replenishment criteria, an internal rate limit determined according to processing capacity of the computing system, and a secondary supplier rate limit, which is less than the primary supplier rate limit.

11. The method of claim 10, wherein the primary supplier rate limit corresponds to a maximum transactions per second rating specified by the third party provider.

12. The method of claim 11, wherein the secondary rate limit is a predefined fraction of the respective primary rate limit.

13. The method of claim 10, wherein replenishing the buffer is further in accordance with a maximum spend threshold for the third party provider.

14. The method of claim 10, wherein replenishing the buffer is postponed for a predefined period of time when replenishment would exceed one or more of:
   (i) the primary supplier rate limit;
   (ii) the secondary supplier rate limit;
   (iii) a maximum spend threshold for the third party provider; and
   (iv) an internal rate limit specified for the computer system.

15. The method of claim 10, wherein the replenishment criteria comprise having remaining inventory items for the first reward card brand and the first denomination fall below a threshold quantity.

16. The method of claim 10, further comprising:
   detecting that two or more rewards cards have been acquired from the third party provider in response to the request from the client device;
   using one of the acquired reward cards to fulfill the request from the client device; and
   inserting residual acquired reward cards into the buffer.

17. The method of claim 10, further comprising determining a buffer size for the first reward card brand and first denomination based on one or more of:
   a purchase history corresponding to the first reward card brand and first denomination;
   a supplier performance history of the third party provider; and
   a storage cost of inventory items for the first reward card brand and first denomination.

18. A non-transitory computer readable storage medium storing one or more programs configured for execution by a computer system having one or more processors and memory, the one or more programs comprising instructions for:
   storing funding accounts, reward card purchase transactions, reward card brand options, denomination options, and a buffer of reward card inventory items in the memory;
   providing a user interface to a client device for purchasing reward cards from a plurality of third party suppliers, including user interface controls to specify funding accounts, reward card brand and denomination options, and email addresses for reward card recipients, wherein the user interface is configured to commit reward card purchase transactions with respect to specified funding accounts and specified reward card brand and denomination options for specified reward card recipients;
   receiving a request from the client device to purchase a reward card for a first reward card brand and having a first denomination;
   determining whether the buffer has a reward card for the first reward card brand having the first denomination;
   in accordance with a determination that the buffer does not have a reward card for the first reward card brand and having the first denomination, invoking an API of the third party supplier to obtain a reward card having the first reward card brand and first denomination, in accordance with a primary supplier rate limit; and
   in accordance with a determination that the buffer does have a reward card for the first reward card brand and having the first denomination, (i) selecting a reward card inventory item from the buffer to complete the received request, and (ii) invoking the API of the third party provider to replenish the buffer with one or more reward cards having the first reward card brand and the first denomination, in accordance with replenishment criteria, an internal rate limit determined according to processing capacity of the computing system, and a secondary supplier rate limit, which is less than the primary supplier rate limit.

* * * * *